Dec. 17, 1940.     R. H. POTTS ET AL     2,224,926
TREATMENT OF FATTY ACIDS
Filed Nov. 9, 1939     2 Sheets-Sheet 1

INVENTORS
Ralph H. Potts
BY John E. McKee
Carl C. Batz
ATTORNEY

Patented Dec. 17, 1940

2,224,926

UNITED STATES PATENT OFFICE 2,224,926

TREATMENT OF FATTY ACIDS

Ralph H. Potts, La Grange, and John E. McKee, Western Springs, Ill., assignors to Armour and Company, Chicago, Ill., a corporation of Illinois Application November 9, 1939, Serial No. 303,642

3 Claims. (Cl. 202—52)

The present invention relates to the treatment of fatty acids and has particular reference to an improved process involving the distillation and fractionation of the fatty acids from a mixture of fatty acids having different boiling points and neutral oil, the process involving certain of the principles described in our copending application Serial No. 96,732, filed August 19, 1936, of which the present application is a continuation in part.

In the vegetable and animal oil industry many occasions arise for the purification of oils and for the production of fatty acids or mixtures of the same in which the fatty acids are subjected to a distillation process. Animal and vegetable oils, such as cottonseed oil, corn oil, and cocoanut oil, customarily are subjected to a process of alkali refining, whereby free fatty acids in the oil are neutralized. The resulting soap flocks to the bottom of the refining kettle, together with some neutral oil that is held by the soap particles. The material thus separated from the oil is known as "foots," and ordinarily will contain on the order of 50 per cent fatty acids, the remainder being impurities and water. Of the fatty acid content of the "foots," approximately 60 per cent may be free fatty acids and the remainder glycerides. These foots represent a type of material which may be treated in accordance with the invention. Other oleaginous materials containing fatty acids also may be treated, but for the sake of brevity the invention will be described as particularly applied to this type of material.

A principal object of the present invention is to provide a process for the distillation of fatty acids in an improved manner which is effective from the standpoint of the distillation operation and which results in a product of high purity, the distillation process being of a type well adapted to combined distillation and fractionation of the fatty acids.

A further object is to provide a process for distilling fatty acids in which the fatty acids are passed through a series of heat exchange tubes which are maintained under vacuum, the outside of the tubes being subjected to a condensing vapor having a boiling point above the vaporization point of the fatty acids under the conditions involved in the process and which will condense on the tubes to impart to the tubes latent heat of liquefaction.

Still another object is the provision of a process for distilling mixed fatty acids in an improved manner and separating the distilled fatty acids into fractions having different boiling points.

A further object is the provision of an improved apparatus and process for fractionating fatty acids.

These and other objects will be evident upon a consideration of the following description and by reference to the accompanying drawings in which.

Figure 1:
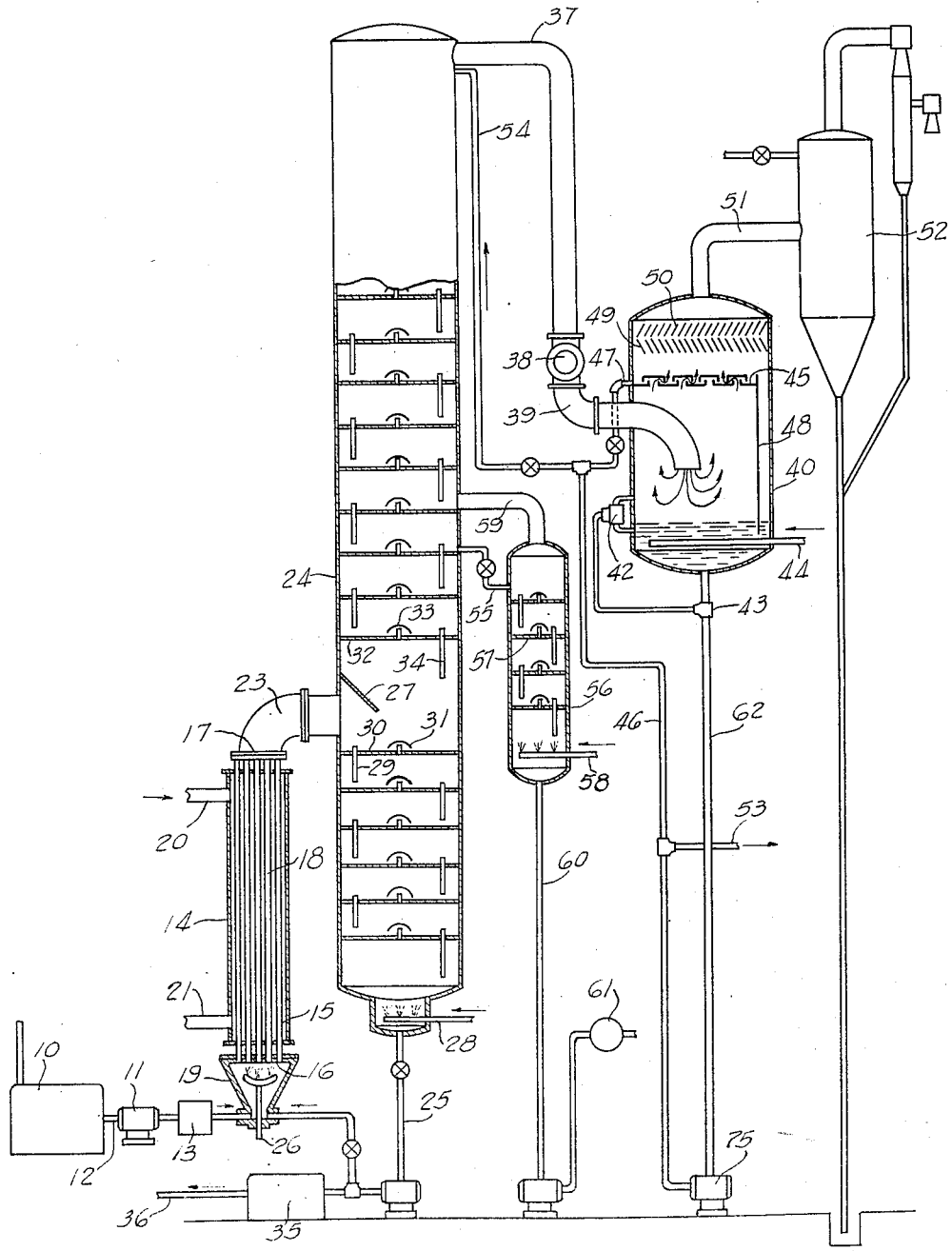
Figure 1 is a schematic representation of an apparatus suitable for carrying out the improved process.

In the treatment of foots of the type described, the foots are acidulated with sulfuric acid in order to break the mass into oil and water. That is, the acid breaks the soap into fatty acid and the sulfate salt of the positive radical combined with the fatty acid. The mass then separates into an oil layer and a water layer, these layers being separately recovered by any suitable process. The fatty material obtained by acidulation of the foots is usually termed "raw fatty acid stock" or "black acid foots." The distillation of fatty acids from this type of material involves several problems which depend to a considerable extent upon the tendency of the fatty acids or fatty acid containing material to be decomposed at the temperatures around the boiling point of the acids. This thermal decomposition results in a viscous residue of little value and a distillate of poor color and odor.

In the device shown in the drawings the stock, having a fatty acid content of the order of 70 per cent, is fed into the feed tank 10 from which the material is transferred by a pump 11 through line 12 and a preheater 13 to the bottom of a tube heater indicated generally at 14. The preheater 13 may be any type of a heat exchange apparatus for conserving heat and raises the temperature of the fatty acid and neutral oil mixture to the order of 350° F.

The tube heater 14 consists of a vertical column 15 of substantial cross section and terminated by a bottom header 16 and a top header 17. A relatively large number of pipes or tubes 18 extend between the headers 16 and 17 and provide openings through which the fatty acid materials being pumped into the conical chamber 19 may be passed.

Communicating with the top of the column 15 is a vapor inlet 20 into which passes a mixture of diphenyl and diphenyl oxide vapors heated to a temperature of about 600° F. These vapors pass downwardly through column 15 and about the tubes 18. The fatty acids rising in the tubes 18 cool the tubes to a temperature below the liquefaction temperature of the vapors in the column 15 and the latter condense into a liquid upon the tubes, thereby imparting to the tubes their latent heat of liquefaction. The liquefied diphenyl and diphenyl oxide trickle down into the bottom of the tower and are withdrawn through line 21 to a suitable heater, not shown, for revaporizing the materials.

This type of vaporization unit is of particular value for fatty acids since the highest temperature to which the acids are subjected is the temperature of the gases as they enter the inlet opening 20. Other heating mediums may be used in the practice of this invention; for example, the tubes of the heater may be exposed directly to fire. However, there is a great advantage in the use of the heating medium above described since this avoids the high local temperatures to which the fatty acid materials are subjected when distilled in a pipe still having tubes disposed directly to fire. Additionally, an effective heat exchange is attained by utilizing the heat of liquefaction of the gases. This heat exchange is so effective that the fatty acids are vaporized very rapidly and the time required for passage of the material through the distillation tubes 18 is quite short. This time preferably is no more than a few seconds and may be less than one second.

In addition to the effective method of heat transfer, the tubes 18 connect with the pipe 23 leading to the fractionating column 24, the latter being maintained under a high vacuum which extends to the tubes 18 and facilitates the vaporization therein. The high vacuum maintained in the tubes 18 provide for rapid distillation at a considerably lower temperature than in processes in which pressure is employed in the heating unit. This feature gives an advantage in that by having the vacuum extend back into the tube heater vaporization may take place within the tubes thus enabling the latent heat of vaporization to be supplied as vaporization takes place, and eliminating the need for raising the materials to a temperature above their boiling points under vacuum conditions.

The fresh feed stock entering into the mixing chamber 19 is at a temperature of about 300° to 350° F. In addition to this fatty acid containing material a substantial quantity of neutral oil is recycled from the fractionating column 24 as will be described more particularly hereinafter, this material being transferred through line 25 from the bottom of the column 24 to the mixing chamber 19. The recycled stock is taken from the bottom of the column 24 at a temperature of about 500° F. and enters the mixing chamber 19 at about the same temperature. Superheated steam at a temperature of about 500° F. is passed into the mixing chamber 19 by the injector 26. This steam creates an initial velocity at the base of the tubes 18 of about 4 to 6 feet per second, the absolute pressure in the blending cone 19 being about 200 to 250 mm. Steam may be introduced into the chamber 19 in an amount of about .05 to about .25 pound of steam per pound of feed stock, the particular amount depending somewhat upon the type of stock being distilled. The use of steam is peculiarly advantageous in connection with the use of reduced pressure in the tube heater; however, the use of steam at this point is not required in order to practice the process of this invention, and satisfactory operation can be had without the use of any steam in the tube heater. As the material passes upwardly through the heater the static pressure diminishes, and the fatty acids are vaporized. These factors combined with the expansion of the steam produce a velocity in the mass at the outlet of the tubes 18 which may be of the order of 150 to 175 feet per second. The temperature of the combined vapor undistilled neutral oil is of the order of 550° F.

As the vapor pipe 23 is of greater cross sectional area than the combined cross sectional areas of the tubes 18, the velocity of the material slows down immediately upon issuing into this vapor pipe. From the vapor pipe 23 the mixture of fatty acid vapors and neutral oil passes into an intermediate portion of the fractionating column 24 beneath a baffle plate 27. As the cross sectional area of the fractionating column is considerably greater than the cross sectional area of the vapor pipe 23, the velocity of the vapors again considerably diminishes.

The vaporous portions of the heating material pass upwardly through the column 24 and the undistilled residue consisting mainly of neutral oil passes downwardly in the tower against a countercurrent of steam injected into the bottom of the column through line 28. The neutral oil passes through pipes 29 of the bubble plates 30 and the steam passes upwardly through the bubble caps 31. Additional quantities of unvaporized fatty acids are stripped from the neutral oil in this manner and the oil collects in the bottom of the column to be withdrawn as desired. The temperature of the steam entering the bottom of the column preferably is of the order of 500° F. so that the bottom of the column is maintained at at least as low a temperature as the temperature of material entering through pipe 23. The steam lowers the vapor pressure of the fatty acids within the column and facilitates the stripping of the neutral oil and fractionation of the fatty acids in the bubble trays 32 positioned above the vapor inlet. The mixed vapors and steam pass upwardly through the bubble caps 33 and the liquid from these trays passes downward through the overflow lines 34. For more even fractionation the total amount of steam mixed with the fatty acid vapors preferably is maintained below substantially 0.5 pound per pound of feed stock, including the steam employed in the distillation and the steam used in the column and for stripping purposes.

The unvaporized residue from the bottom of the fractionating column 24 is divided into two streams, one of which passes into the mixing chamber 19 of the still and the other which passes into a tank 35.

The unvaporized residue in tank 35 is accumulated until the desired amount is obtained. Thereafter this residue is subjected to a splitting operation to produce a mixture containing fatty acids in an amount which may be of the order of 80 to 90 per cent, the remainder including pitch and unsaponifiable matter. The hydrolyzed mixture then is withdrawn through line 36 and subjected to a distillation operation preferably in a separate still. The fatty acids obtained from this distillation may be treated as described herein and the residue is disposed of as pitch. If distilled in the same still as the original feed stock, the mixture is distilled preferably separate from substantial quantities of fresh feed stock in order that the undistilled residue of the latter will not be contaminated.

The mixture is substantially completely distilled in the heater 14 and enters the fractionating column in the form of a mixture of vapor and neutral oil. As the vapors arise through the tower they are met with a downwardly flowing stream of a reflux liquid which preferably initially is composed of a condensate of a lighter fraction of fatty acid taken from adjacent the top of the fractionating column. This condensate flows downwardly across the bubble plates and in traveling upward through the fractionating column the higher boiling constituents of the fatty acid vapors are condensed by the reflux and the material on each succeeding higher plate is of a lower boiling point. The fractionating column reaches the state of equilibrium in which the composition of the material on each plate remains substantially constant and the boiling point of the material on each higher plate is lower than the liquid on the next lower plate. The vapors pass upwardly through a series of pools of liquid containing the different constituents of the vapors in varying amounts, and having progressively lower boiling points.

The liquid on the lower plates of the fractionating column will contain greater quantities of oleic acid and if it is desired to obtain a fractional change in this acid, the material from the plates will be withdrawn, as desired.

From the upper bubble plate of the fractionating column the vapors, consisting principally of steam and palmitic acid, pass through line 37 into a condenser 38 which reduces the temperature of the vaporized material to about 150. F., thereby liquefying the fatty acids. As the entire system is maintained under a high vacuum the steam does not liquefy at this temperature. This steam contains a considerable portion of the liquefied fatty acids in a finely divided entrained form which makes separation difficult. The steam is passed from the condenser 38 through line 39 to a mist-extracting tank 40. The vapor line 39 extends downwardly in the tank 40 and terminates at an intermediate point therein so that the steam initially passes downwardly and then changes its direction to pass upwardly, somewhat as shown by the arrows in the drawings. The diameter of the tank 40 is greatly larger than the diameter of the line 39, so that the velocity of the vapors in the tank 40 is greatly less than the velocity of the steam in the line 39. This reduction in the vapor velocity and change of direction of the vapors results in separation of a substantial portion of the entrained matter.

There is maintained in the bottom of the tank 40 a body of the separated fatty acids as indicated in the drawing. A liquid level control mechanism 42 regulates the draw-off valve 43 of the tank 40 in such a manner as to maintain a constant level in the body of liquid which is considerably below the bottom of the line 39. The temperature of this liquid may be maintained at 150° F. by the closed steam coil 44. After initially passing downwardly in the separator 40 the steam passes upwardly through a bubble plate indicated at 45 upon which is pumped a portion of the liquid from the bottom of tank 40, this liquid being transferred through draw-off line 62, pump 75 and lines 46 and 47.

A suitable weir plate 48 is provided in the tank 40 for overflow from the bubble plate 45, this plate being sealed in the usual manner. Steam vapors passing up through the bubble plate contact the liquid therein and this liquid acts to remove further quantities of the entrained fatty acids from the steam. Two sets of baffle plates 49 and 50 may be positioned above the bubble plate to provide a still further reduction in the quantity of entrained matter contained in the steam.

From the tank 40 the steam passes through line 51 to a vacuum apparatus indicated at 52 which may include a barometric condenser connected to suitable vacuum pumps, not shown.

The desired quantity of the relatively low boiling fatty acids may be passed from the tank 40 through lines 62 and 53 to a suitable source of disposal.

A further quantity of the liquefied low boiling fatty acids from the tank 40 is passed through lines 62, 46 and 54 into the top of the column as reflux liquid. Where the mixture of fatty acids is fractionated into two components, it is desirable to return as reflux a greater quantity of the lower boiling fatty acids than the quantity being removed from the process as distillate. That is, where 600 to 800 pounds of fatty acids are removed as product per hour, the reflux should preferably be of the order of 3000 pounds per hour. As before stated, the heat required for handling this reflux and providing for fractionation in the column may be supplied at least in part by the neutral oil recirculated from the bottom of the column through the still.

The second fraction may be taken from the column at any desirable point depending upon the type of product required. For example, somewhere in the fractionating column may be found a plate which will contain unsaturated acids in the greatest degree of concentration. The liquid may be withdrawn from this plate through line 55 and passed into a stripper 56 which contains a series of bubble plates 57. Steam is introduced into the bottom of the stripper 56 through line 58. The palmitic or saturated acid removed by this steam may be returned to the column through line 59. The unvaporized unsaturated acids settle in the bottom of the stripper 56 and are withdrawn through line 60 and cooled in a cooler 61. Thereafter the material is transferred to a suitable source of disposal. This liquid is fairly pure mixture of oleic and linoleic acids and will be found to contain only a small amount of saturated acid, a more complete separation, if desired, being dependent upon further treatment.

In the fractionation of fatty acids the column must be operated within rather narrow vacuum limits. The pressure at the top of the fractionating tower may be of the order of 5 mm. of mercury, or as low as is practicable to maintain, and the pressure at the vapor inlet may be of the order of 30 or 40 mm. of mercury or as low as can be maintained with the vacuum applied at the top of the column while still obtaining fractionation of satisfactory sharpness.

It will be recognized that many changes may be made in the process and structure described herein without departing from the scope of the invention as described in the appended claims. For example, the means for supplying heat to the fractionating column may be other than that illustrated in Figure 1.

Figure 2:
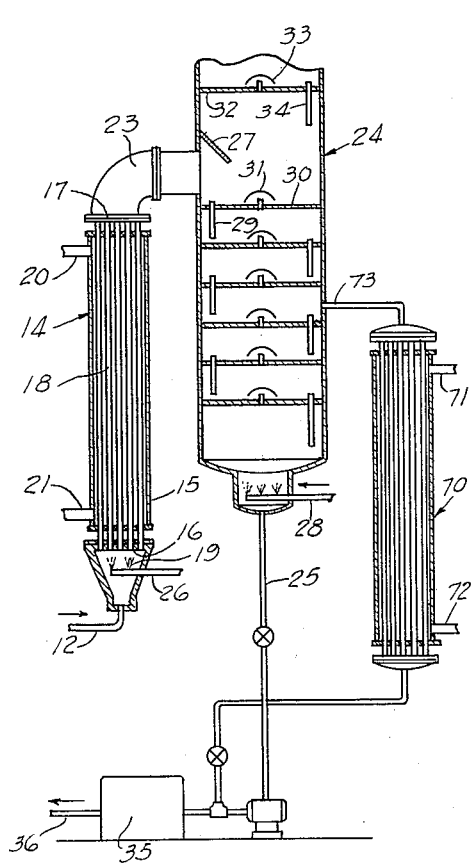
Figure 2 is a view showing another means of supplying heat to the fractionating column which might be substituted for that shown in Figure 1.

Referring more particularly to Figure 2 of the drawings the glycerides at the bottom of the column are withdrawn through line 25 and a part is passed through the secondary heater 70 where its temperature is raised, and from this heater it is introduced back into the column. The point of introduction back into the column may be at any suitable point below the feed stock inlet. Heater 70 may be of the same type as heater 14, having the inlet 71 and outlet 72 for the mixture of diphenyl and diphenyl oxide. In the drawing the material is shown as being withdrawn from the bottom of the column, reheated, and introduced through line 73 on the third tray from the bottom, but the material may be withdrawn from other desired zones in the lower portion of the column and introduced at other zones including the zone from which it was withdrawn. In principle this means of supplying heat is substantially the same as that shown in Figure 1, except that here the glycerides by means of which the heat is added, are recirculated independently of the fatty acid feed stock. It will be understood that the glyceride materials cause less trouble in reheating than do the fatty acids themselves. The heated glyceride materials reintroduced within the lower portion of the column provide heat for the reboiling of the reflux liquid descending within the column.

Figure 3:
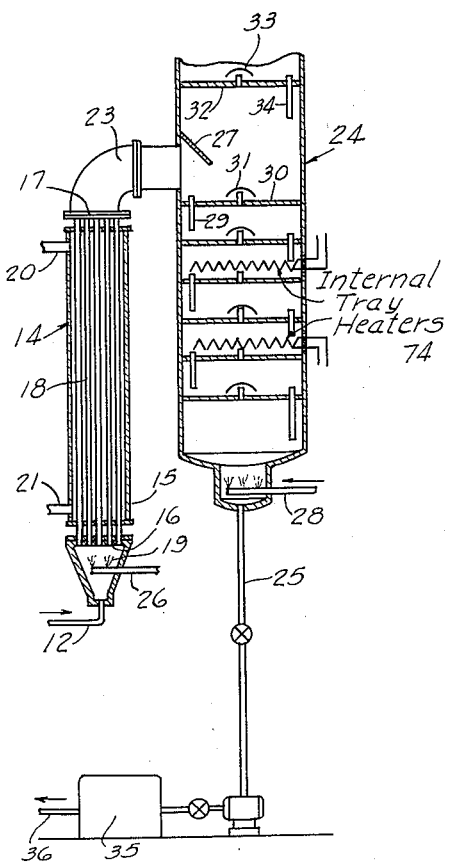
Figure 3 is a view of still another means for supplying heat to the fractionating column which means might be used instead of that shown in Figure 1.

Still another means of supplying heat for reboiling reflux is illustrated in Figure 3 of the drawings. Here the tray heaters 74 which may contain electrical elements, pass heat directly to the glycerides on the trays in the lower portion of the column, and these in turn serve as the means for supplying heat to the zones throughout the tower for reboiling the descending reflux liquid. The heaters 74 may be spaced along the tower's height and though only two are here shown, as many may be used as desired.

We claim:

1. The process for distilling fatty acid materials which comprises passing a mixture of fatty acids through a tube subjected to a temperature high enough to heat said acids and to vaporize fatty acids in a portion of said tube where the acids absorbs heat, passing the vaporized fatty acids upwardly through heat exchange zones of condensed fatty acids having successively lower boiling points against a countercurrent of reflux liquid, and maintaining a condition of substantially reduced pressure which extends through said zones and at least to the vaporization portion of said tube.

2. The process for distilling fatty acid materials which comprises passing a mixture of fatty acids and steam through a tube subjected to a temperature high enough to heat said acids and to vaporize fatty acids in a portion of said tube where the acids absorb heat, passing the volatilized fatty acids upwardly through heat exchange zones of condensed fatty acids having successively lower boiling points against a countercurrent of reflux liquid, and maintaining a condition of substantially reduced pressure which extends through said zones and at least to the volatilization portion of said tube.

3. The process for distilling fatty acid materials which comprises passing a mixture including fatty acids and oil through a tube subjected to a temperature high enough to heat said acids and to vaporize fatty acids in a portion of said tube where the acids absorb heat, passing the oils and fatty acids through an expansion zone in which said fatty acids are stripped from said oil, passing the vaporized fatty acids through heat exchange zones of condensed fatty acids having successively lower boiling points against a countercurrent of reflux liquid, and maintaining a condition of substantially reduced pressure which extends within said expansion zone and at least to the vaporization portion of said tube.

RALPH H. POTTS.
JOHN E. McKEE.